(12) United States Patent
Rossi et al.

(10) Patent No.: US 8,903,665 B2
(45) Date of Patent: Dec. 2, 2014

(54) METHOD AND DEVICE FOR PROTECTING AN ELECRONIC PAYMENT TERMINAL

(75) Inventors: Laurent Rossi, Dreux (FR); Bernard Schang, Le Mesnil Saint Denis (FR)

(73) Assignee: Compagnie Industrielle et Financiere D'Ingenierie "Ingenico", Neuilly-sur-Seine (FR)

( * ) Notice: Subject to any disclaimer, the term of this patent is extended or adjusted under 35 U.S.C. 154(b) by 407 days.

(21) Appl. No.: 13/233,601

(22) Filed: Sep. 15, 2011

(65) Prior Publication Data

US 2012/0065908 A1   Mar. 15, 2012

(30) Foreign Application Priority Data

Sep. 15, 2010 (FR) ........................................ 1057387

(51) Int. Cl.
  *G01R 31/00* (2006.01)
  *G07F 19/00* (2006.01)
  *G06F 21/83* (2013.01)

(52) U.S. Cl.
  CPC .......... *G07F 19/205* (2013.01); *G07F 19/2055* (2013.01); *G06F 21/83* (2013.01); *G07F 19/20* (2013.01)
  USPC .......................................................... 702/58

(58) Field of Classification Search
  USPC .................. 702/58; 370/238.1, 310.1, 395.51
  See application file for complete search history.

(56) References Cited

U.S. PATENT DOCUMENTS

| | | | |
|---|---|---|---|
| 5,446,391 A | 8/1995 | Aoki et al. | |
| 6,390,367 B1 | 5/2002 | Doig | |
| 6,853,093 B2 | 2/2005 | Cohen et al. | |
| 6,983,378 B1 | 1/2006 | Kokubo | |
| 7,015,823 B1 | 3/2006 | Gillen et al. | |
| 7,024,565 B1 | 4/2006 | Beiley et al. | |
| 2007/0295810 A1 | 12/2007 | Hopt et al. | |
| 2007/0296709 A1 | 12/2007 | GuangHai | |
| 2008/0278355 A1 | 11/2008 | Moore et al. | |

(Continued)

FOREIGN PATENT DOCUMENTS

| | | |
|---|---|---|
| EP | 1804557 A1 | 7/2007 |
| EP | 1873680 A1 | 1/2008 |

(Continued)

OTHER PUBLICATIONS

Office Action dated Jan. 14, 2013 for corresponding U.S. Appl. No. 13/233,573, filed Sep. 15, 2011.

(Continued)

*Primary Examiner* — Elias Desta
(74) *Attorney, Agent, or Firm* — David D. Brush; Westman, Champlin & Koehler, P.A.

(57) ABSTRACT

A device is provided for protecting an electronic payment terminal. The device includes at least one capacitive detector placed between a lower mechanical supporting element of a keypad of the terminal and an upper mechanical supporting element of the keypad of the terminal. The at least one detector is configured to deliver a reference capacitance. A capacitive measurement microprocessor is electrically connected to the at least one capacitive detector and configured to detect a variation of capacitance of the at least one capacitive measurement support. A transmitter is configured for transmitting a piece of information representing the capacitive variation, when an absolute value of a difference between the measured capacitance and the reference capacitance exceeds a predetermined threshold. The capacitive detector is conformed so that it extends between holes of the lower mechanical supporting element.

7 Claims, 2 Drawing Sheets

(56) References Cited

U.S. PATENT DOCUMENTS

| | | | |
|---|---|---|---|
| 2009/0058628 A1 | 3/2009 | Kirmayer | |
| 2009/0271004 A1* | 10/2009 | Zecchin et al. | 700/13 |
| 2010/0090714 A1 | 4/2010 | Van Geloven et al. | |
| 2011/0095919 A1 | 4/2011 | Ostermoller et al. | |

FOREIGN PATENT DOCUMENTS

| | | | |
|---|---|---|---|
| EP | 1927931 A1 | 6/2008 | |
| EP | 2109058 A1 | 10/2009 | |
| FR | 2857113 A1 | 1/2005 | |
| WO | 2009103594 A1 | 8/2009 | |
| WO | 2010007314 A2 | 1/2010 | |

OTHER PUBLICATIONS

French Search Report dated May 24, 2011 for corresponding French Application No. FR1057387, filed Sep. 15, 2010.
French Search Report dated May 18, 2011 for corresponding French Application No. FR1057385, filed Sep. 15, 2010.
French Search Report dated Aug. 12, 2011 for corresponding French Application No. FR1057383, filed Sep. 15, 2010.
French Search Report dated May 17, 2011 for corresponding French Application No. FR1057381, filed Sep. 15, 2010.
Office Action dated Aug. 27, 2013 for corresponding U.S. Appl. No. 13/233,567, filed Sep. 15, 2011.
Notice of Allowance dated Jun. 21, 2013 for corresponding U.S. Appl. No. 13/233,573, filed Sep. 15, 2011.
Office Action dated Aug. 13, 2013 for corresponding U.S. Appl. No. 13/233,597, filed Sep. 15, 2011.
Analog Devices AD7142 Data Sheet, 2007, Analog Devices Inc., p. 1.
Machine Translation of WIPO Patent Application Publication to Inventor Pierre Lacroix WO 2010/007314 A2, Jan. 21, 201. Translation pf. pp. 1-15. created on Aug. 11, 2013.
Advisory Action dated Jul. 25, 2014 for corresponding U.S. Appl. No. 13/233,597, filed Sep. 15, 2011.
Notice of Allowance dated Sep. 18, 2014 for corresponding U.S. Appl. No. 13/233,597, filed Sep. 15, 2011.
Final Office Action dated Mar. 5, 2014 for corresponding U.S. Appl. No. 13/233,567, filed Sep. 15, 2011.
Notice of Allowance dated May 22, 2014 from the United States Patent and Trademark Office for corresponding U.S. Appl. No. 13/233,567, filed Sep. 15, 2011.

* cited by examiner

METHOD AND DEVICE FOR PROTECTING AN ELECRONIC PAYMENT TERMINAL

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure pertains to the field of the securing of payment devices.

The present disclosure pertains more particularly to a device used to detect the joining on, to a payment device, of hardware aimed at fraudulently obtaining confidential data such as bank data.

There are many devices enabling users to pay for purchases. More particularly, payment devices using bank cards such as smart chip cards or stripe cards which are becoming widespread. These devices are generally called payment terminals and enable purchases to be paid for in a simple and swift manner. Other devices also use smart chip cards or magnetic track cards: these are for example bank terminals such as automated teller machines (ATMs) or automated cash-dispenser machines. Here below, all these devices, which include both entry keypads and a memory card readers, shall be called payment terminals.

One of the characteristics of these payment terminals is that they are installed outdoors. More specifically, these terminals are often installed outdoors so that users can access payment services outside standard working hours or make the operations they wish to make (payments, consulting bank balances, bank transfers) more easily and more swiftly.

Thus, it is frequent and very common for these terminals, in which clients place full trust, to be installed in surroundings which are more or less inadequate given the pieces of data that are handled during payment and consulting operations.

Indeed, the installation of payment terminals outdoors has led to the emergence of a new type of fraud known as the "Lebanese loop". In this type of fraud, a false keypad is installed on top of the original keypad of the payment terminal (this is the "keypad" overlay). The automatic cash dispenser or the automated teller machine then refuses to release the card inserted therein.

Another technique, called "skimming", consists of the installation, on the inserting slot, of a terminal of a device (the "slot overlay") used to decode the magnetic track or record the data on the chip of the bank card. The placing of such a device on the card insertion slot is accompanied by the placing of a false keypad ("keypad overlay") or the positioning of a camera to film the confidential code of the card-holder when the payment terminal asks for this code. The pieces of data read by this fraudulent device are directly transmitted to the fraudulent persons by means of an SMS/MMS type message.

BACKGROUND OF THE DISCLOSURE

All providers of payment terminals and a certain number of third-party providers are capable of providing anti-skimming solutions of varying effectiveness. A European test team (European ATM Security Team) has set up and maintains a data base of anti-skimming solutions and their functions. However, at present there is no certification or independent evaluation of these solutions and certain solutions are more efficient than others.

Many solutions have thus been proposed to overcome these problems of security posed by payment terminals when they are installed in unreliable environments. These solutions include the modification of the terminal, for example by modifying the shape of the terminal. This modification of shape takes the form of the addition of specific volumes which prevent a fraudulent bank-data-reading device from being attached or glued to the payment terminal.

However, the efficiency of this solution is quite relative. Indeed, the fabrication of fraudulent bank-data-reading devices by the manufacturers of these devices is generally a cottage industry and these manufacturers are capable of adapting to the specific constraints of terminals to which the devices must be adapted. It is therefore very simple, for the manufacturers of fraudulent bank-data-reading devices to modify the shape of their devices as a function of the payment terminals.

Another approach which has been proposed consists in providing the terminal with pressure sensors at determined places of the terminal. These pressure sensors are supposed to sense the joining on of a fraudulent bank data reading device.

Here too, the adaptability displayed by the manufacturers of fraudulent devices means that the total reliability of this solution cannot be ensured.

In another solution, the payment terminal is provided with a scrambling device which disturbs the transmission of data sent from any fraudulent device. Another solution is that of providing the keypad with a specific concealment ensuring that the confidential code entered by the bank card reader cannot be recorded when keyed in by a camera hidden beside or in the payment terminal.

The patent FR2857113 which relates to the field of the present disclosure describes a secured case containing a keypad used to introduce confidential data such as a personal identification number intended in particular for an electronic payment system secured in the aspects of mechanical, electronic and electromagnetic emission. It has a capacitive matrix touch screen on the one hand connected by connection wires to a printed circuit board bearing the associated controller, a security module as well as electronic circuitry sensitive to variations in the capacitance of the system. On the other hand, it is sandwiched between two glass plates, namely a front or protection glass plate and a rear or supporting glass plate. The problem with the solution provided by the patent FR2857113 is firstly that it does not apply to the positioning of the mechanical keypad (the keypad protected in the patent FR2857113 is a numerical keypad displayed on a touch screen). Secondly, the system of FR2857113 cannot resolve the problems arising out of the installation of a system at the slot of the payment terminal. Finally, the solution proposed by the patent FR2857113 is costly and complex to implement.

To date, there is no solution that totally resolves this problem for a cost deemed to be reasonable. Now, it is important to provide payment terminals in which the users can place trust, namely terminals that are not in any way too costly to produce.

SUMMARY

An exemplary embodiment does not have the drawbacks of the prior art.

An exemplary embodiment of the invention pertains to a device for protecting an electronic payment terminal. According to an embodiment of the invention, such a device comprises:

- at least one capacitive detector placed between a lower mechanical supporting element of a keypad of said terminal and an upper mechanical supporting element of said keypad of said terminal, said at least one detector being configured to deliver a reference capacitance;
- a capacitive measurement microprocessor electrically connected to said at least one capacitive detector, configured to detect a variation of capacitance of said at least one capacitive measurement support;
- means for transmitting a piece of information representing said capacitive variation, when an absolute value of a difference between said measured capacitance and said reference capacitance exceeds a predetermined threshold.

Thus, an embodiment of the invention can be used to sense the joining on of fraudulent devices to the payment terminal. Indeed, one of the characteristics of fraudulent hardware, in whatever form, is that it comprises a non-negligible quantity of conductive metal and materials. The joining on of fraudulent devices therefore modifies the quantity of electrical charge stored for a given electrical potential which, in the context of an embodiment of the invention, is the capacitive detector positioned at predefined locations.

An embodiment of the invention thus improves the security of the payment terminal and more particularly protects the payment terminal from known attacks called "overlay" or "Lebanese loop" attacks.

It efficiently combats the positioning, with fraudulent intent, of fraudulent devices on the keypad and on the smart card insertion slot.

According to one particular embodiment, said protection device further comprises calibration means delivering said reference capacitance.

According to one particular embodiment, said capacitive detector is shaped so that it extends between the holes of said lower mechanical supporting element.

According to one particular embodiment, said capacitive detector has the general shape of a rake with a plurality of teeth.

According to one particular characteristic, said capacitive detector further comprises an additional tooth which, when the device of an embodiment of the invention is assembled in the payment terminal, is positioned parallel to the slot used for inserting the card into said terminal.

According to another aspect, an embodiment of the invention also pertains to a method for protecting an electronic payment terminal comprising at least one printed circuit and one case, said protection device comprising:

- at least one capacitive detector positioned between a lower mechanical supporting element of a keypad of said terminal and an upper mechanical supporting element of said keypad of said terminal, said at least one detector being configured to deliver a reference capacitance;
- a capacitive measurement microprocessor electrically connected to said at least one capacitive detector, configured to detect a variation in the capacitance of said at least one capacitive measurement support;
- means for transmitting a piece of information representing said variation of capacitance when an absolute value of a difference between said measured capacitance and said reference capacitance exceeds a predetermined threshold.

According to an embodiment of the invention, such a method comprises at least one iteration of the following steps:

- measuring of a current capacitance by means of said capacitive detector;
- computing said absolute value of a difference between said measured capacitance and said reference capacitance;
- transmitting said piece of information representing said variation in capacitance when said absolute value exceeds said predetermined threshold.

According to one particular embodiment, during a first powering-on of said electronic payment terminal, a step is performed for calibrating said terminal delivering said reference capacitance.

According to another aspect, an embodiment of the invention also pertains to a computer software product downloadable from a communications network and/or stored on a computer-readable carrier and/or executable by a microprocessor. According to an embodiment of the invention, such a computer software program comprises program code instructions to execute the protection method as described here above when it is executed on a computer.

BRIEF DESCRIPTION OF THE DRAWINGS

Other features and advantages shall appear more clearly from the following description of a preferred embodiment, given by way of a simple illustratory and non-restrictive example and from the appended drawings, of which.

DETAILED DESCRIPTION OF ILLUSTRATIVE EMBODIMENTS

1. Description of One Embodiment

The principle of an embodiment of the invention is that of detecting an excessive modification of electrical capacitance in a payment terminal.

An embodiment of the invention thus proposes to detect a modification of the capacitance (i.e. a modification of the electrical charge) contained in one or more capacitive detectors placed at particular positions in the payment terminal: beneath the keypad or at the card insertion slot.

To this end, the device of an embodiment of the invention comprises at least one capacitive detector placed between a supporting plate for the keys of the mechanical keypad of the payment terminal and a support defining the pressure points of the keypad keys. This capacitive detector comprises a predetermined capacitance known to a capacitive measurement microprocessor, electrically connected to the capacitive detector and configured to detect a variation in capacitance of the capacitive detector. The device also comprises a transmitter configured for transmitting a piece of information representing a variation in capacitance, when an absolute value of a difference between a measured capacitance, at a given point in time, and the reference capacitance exceeds a threshold which is also predetermined.

The capacitive detector is simply placed beneath the keys of the mechanical keypad. The placing of the capacitive detector is therefore a simple and low-cost operation that does not require the building of a supporting structure or of a particular device.

The capacitive detector, in a first embodiment, is thus characterized by a shape adapted to being placed between the holes enabling the actuation of the keys of the keypad beneath which it is positioned, as described with reference to FIG. 1.

Figure 1:
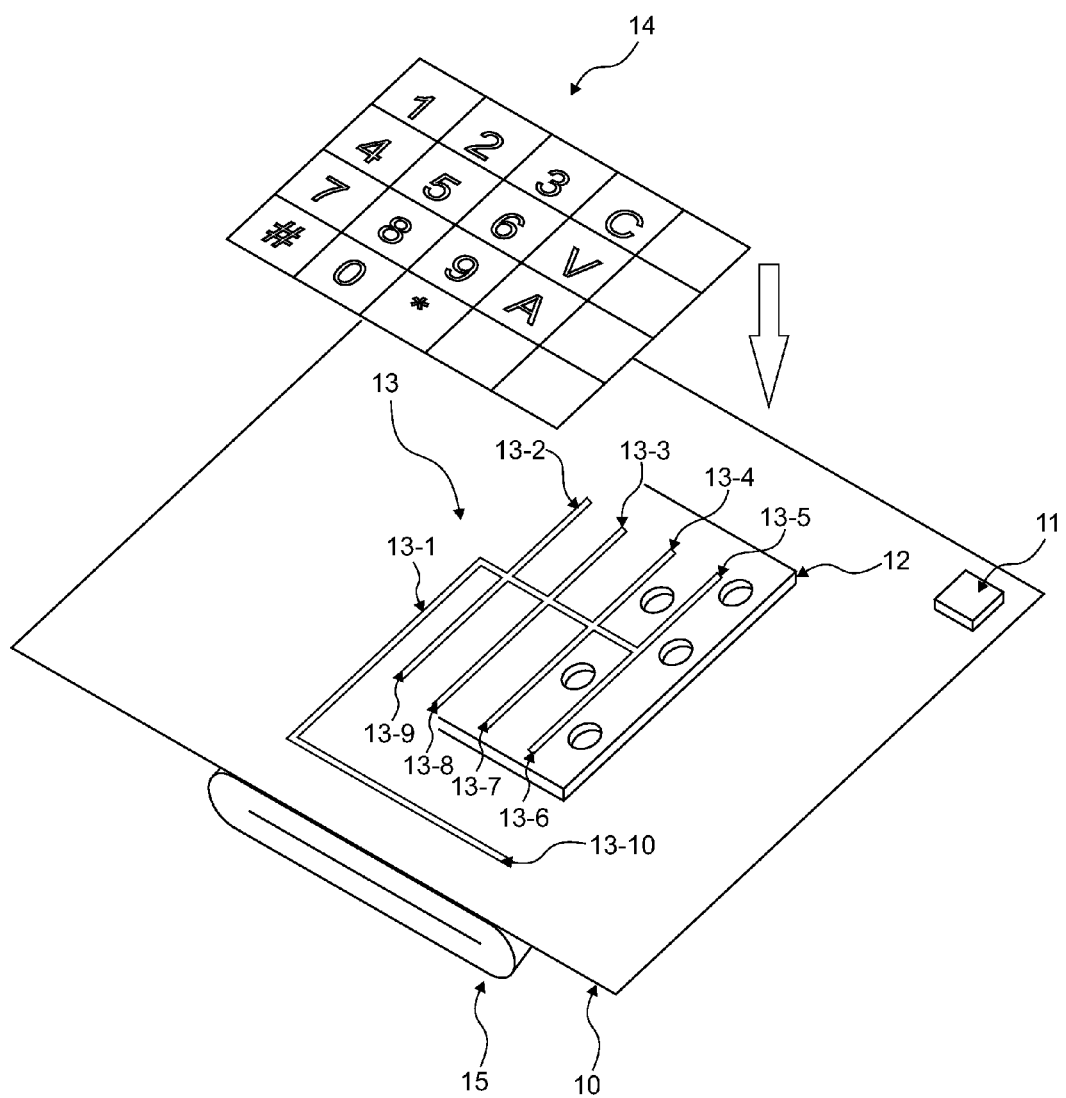
FIG. 1 is a drawing of a detection device according to an embodiment of the invention.

More particularly, FIG. 1 describes a multilayer printed circuit board (PCB) 10 on which there are positioned electronic components 11 which can be surface-mounted components (SMCs) or components soldered to the printed circuit board.

A lower mechanical supporting element 12 containing the elements resting on the pressure points of the keypads also takes position on the printed circuit board 10. This support is mounted on the printed circuit during the fabrication of the terminal. According to an embodiment of the invention, the capacitive detector 13 is placed on the mechanical supporting element 12. The capacitive detector 13 is electrically connected to the capacitive measurement microprocessor (not shown). When the payment terminal is being mounted, the supporting plate for the keys of the keypad 14, which constitutes the upper mechanical supporting element 14, conceals the capacitive detector 13 which is thus invisible both to authorized users and to fraudulent individuals.

According to one particular characteristic of an embodiment of the invention, the capacitive detector 13 has the general shape of a rake (13-1) comprising a plurality of teeth (13-2 to 13-9). It is characterized more particularly by the fact that it is configured to conform to the position of the keys of the keypad. More particularly, the shape of the capacitive detector 13 is defined in such a way that the teeth (13-2, 13-9) do not obstruct the holes of the mechanical supporting element 13 of the pressure points (whether it is holes for the true keys or for the false keys intended for another measure of protection for the terminal). Indeed, since the measures taken to protect terminals are increasingly numerous, it is necessary, in order that the terminal may work correctly, that the protection devices inserted into the terminals should not interfere with each other.

According to another characteristic of an embodiment of the invention, the capacitive detector 13 furthermore comprises an additional tooth (13-10) which, when the device of an embodiment of the invention is assembled in the payment terminal, is to be positioned in parallel to the card (payment card, access card etc) insertion slot 15. This characteristic makes it possible, with a single capacitive detector 13, to fulfill the function of detecting both the placing of a false keypad and the placing of a false card reader. Thus, it is not necessary to provide two capacitive detectors. Since a single support is enough to fulfill both functions, it is furthermore not necessary to provide two different calibrations. This further facilitates the implementation of the device as compared with prior-art devices and therefore reduces its cost.

2. Initial Parametrizing

To make it possible to provide the expected service, the device of an embodiment of the invention is parameterized in order to determine the predetermined value of the reference capacitance. This reference capacitance makes it possible, as already explained, to control the variation in capacitance over time and determine whether this variation exceeds a predetermined value.

When the payment terminal in which the device of an embodiment of the invention is mounted is first powered on, a calibration measurement and a parametrizing operation are performed to identify the reference value, at rest in a neutral electromagnetic environment, of the capacitance of the capacitive detector.

Subsequently, this initial calibration sets up the reference capacitance. In standard working mode, a variation of the capacitance measured relatively to the reference capacitance is accepted of course in order to enable a normal operation of the payment terminal.

A value known as "delta" fixes the upper and lower bounds within which the measured capacitance values will be considered to be valid. The measurements are made periodically, either at regular intervals or at predefined times (for example at night).

Indeed, the inventors have noted that fraudulent activity involving the placing of fraudulent devices (for example false keypads and false card readers) is generally carried out during short periods of time: about half an hour. Such a practice by fraudulent individuals, can be explained by the fact that the fraudulent individuals are often physically present in an area very close to the place where the payment terminal targeted by the fraudulent activity is installed, and that they need to act speedily on this terminal. Thus, to avoid observation, the duration of the fraudulent activity is often restricted.

To be able to counter fraudulent activity, it is therefore necessary to make measurements at times when the fraudulent activity is likely to occur. Thus, the device can also be configured to define ranges of measurement adapted to the final position of the payment terminal. For example, if it is a gas station, the measurements are more likely to be done at night, repeatedly or continuously since it is at night that the payment terminal is left without surveillance.

If there is a cut in the electrical supply coming from the mains, the safety units of the terminal continue to work on battery. In this case, the device is configured for periodically putting the "capacitive" processor to sleep and reviving it to enable the regular measurement of the capacitive detectors (for example every 500 milliseconds).

Indeed, since the device of an embodiment of the invention consumes very little electrical current, it can be implemented without the presence of an electrical power supply coming from the mains. Thus, the system of an embodiment of the invention can ensure the security of the terminal continuously with or without the presence of mains current.

Under certain strict conditions, a system of environmental compensation may modify the base line or reference value. Such a system can be added on to the device of an embodiment of the invention to ensure efficient operation of the payment terminal as a function of the environment in which it is installed.

A software filtering is also performed to single out events modifying the field lines that are not real installations of fraudulent devices (handling of the terminal etc).

All the measurements are driven by a microprogram associated with the capacitive measurement microprocessor.

Figure 2:
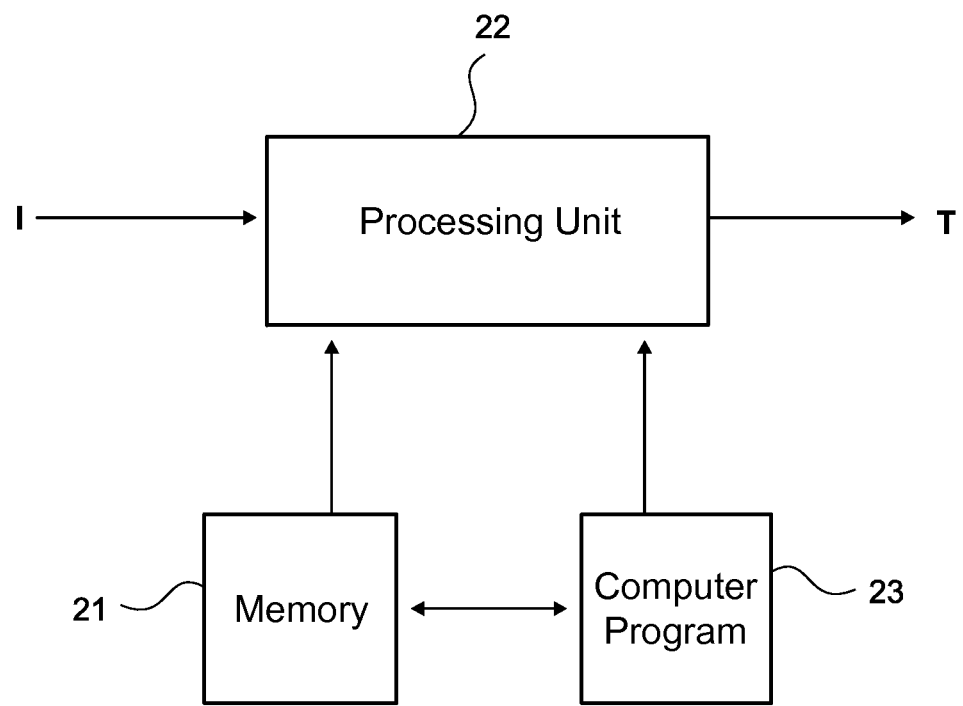
FIG. 2 is a schematic view of a payment terminal according to an embodiment of the invention.

Referring to FIG. 2, we present an embodiment of a payment terminal.

Such a terminal comprises a memory 21 constituted by a buffer memory, a processing unit 22, equipped for example with a microprocessor P, and driven by the computer program 23 implementing the protection method according to an embodiment of the invention.

At initialization, the instructions of the computer program code 23 are for example loaded into a RAM and then executed by the processor of the processing unit 22. The processing unit 22 inputs at least one piece of information I such as the identifiers of localization areas. The microprocessor of the processing unit 22 implements the steps of the protection method described here above according to the instructions of the computer program 23 to deliver a piece of processed information T such as the detection of an attack leading to the elimination of the protected data. To this end, the terminal comprises, in addition to the buffer memory 21:

at least one capacitive detector positioned between a lower mechanical supporting element of a keypad of said terminal and an upper mechanical supporting element of said keypad of said terminal, said at least one detector being configured to deliver a reference capacitance;

a capacitive measurement microprocessor electrically connected to said at least one capacitive detector, configured to detect a variation in capacitance of said at least one capacitive measurement support;

a transmitter configured for transmitting a piece of information representing said variation of capacitance when an absolute value of a difference between said measured capacitance and said reference capacitance exceeds the predetermined threshold.

These elements are driven by the microprocessor of the processing unit.

Although the present disclosure has been described with reference to one or more examples, workers skilled in the art will recognize that changes may be made in form and detail without departing from the scope of the disclosure and/or the appended claims.

The invention claimed is:

1. A device for protecting an electronic payment terminal, wherein the device comprises:
   at least one capacitive detector placed between a lower mechanical supporting element of a keypad of said terminal and an upper mechanical supporting element of said keypad of said terminal, said at least one detector having the general shape of a rake with a plurality of teeth and being conformed so that the detector extends between holes of said lower mechanical supporting element and being configured to deliver a reference capacitance;
   a capacitive measurement microprocessor electrically connected to said at least one capacitive detector, configured to detect a variation of capacitance of said at least one capacitive measurement support;
   a transmitter configured for transmitting a piece of information representing said capacitive variation, when an absolute value of a difference between said measured capacitance and said reference capacitance exceeds a predetermined threshold.

2. The device for protecting according to claim 1, wherein the device further comprises calibration means for delivering said reference capacitance.

3. The device according to claim 1, wherein said capacitive detector further comprises an additional tooth which, when the device is assembled in the payment terminal, is positioned parallel to a slot used for inserting a card into said terminal.

4. A method for protecting an electronic payment terminal comprising at least one printed circuit and one case, said method comprising at least one iteration of the following steps:
   measuring of a current capacitance by at least one capacitive detector of a protection device for protecting said electronic payment terminal, wherein said protection device comprises:
      said at least one capacitive detector, which is positioned between a lower mechanical supporting element of a keypad of said terminal and an upper mechanical supporting element of said keypad of said terminal, said at least one detector having the general shape of a rake with a plurality of teeth and being conformed so that the detector extends between holes of said lower mechanical supporting element and being configured to deliver a reference capacitance; and
      a capacitive measurement microprocessor electrically connected to said at least one capacitive detector, configured to detect a variation in the capacitance of said at least one capacitive measurement support;
   computing an absolute value of a difference between said measured capacitance and said reference capacitance; and
   transmitting a piece of information representing said variation in capacitance when said absolute value exceeds said predetermined threshold.

5. The method according to claim 4, wherein the method further comprises, during a first powering-on of said electronic payment terminal, a step of calibrating said terminal delivering said reference capacitance.

6. A non-transitory computer-readable medium comprising a computer software product stored thereon and executable by a microprocessor, wherein the product comprises program code instructions to execute a method of protecting an electronic payment terminal comprising at least one printed circuit and one case, when the instructions are executed, wherein the method comprises at least one iteration of the following steps:
   measuring of a current capacitance by at least one capacitive detector of a protection device for protecting said electronic payment terminal, wherein said protection device comprises:
      said at least one capacitive detector, which is positioned between a lower mechanical supporting element of a keypad of said terminal and an upper mechanical supporting element of said keypad of said terminal, said at least one detector having the general shape of a rake with a plurality of teeth and being conformed so that the detector extends between holes of said lower mechanical supporting element and being configured to deliver a reference capacitance; and
      a capacitive measurement microprocessor electrically connected to said at least one capacitive detector, configured to detect a variation in the capacitance of said at least one capacitive measurement support;
   computing an absolute value of a difference between said measured capacitance and said reference capacitance; and
   transmitting a piece of information representing said variation in capacitance when said absolute value exceeds said predetermined threshold.

7. The device of claim 1, wherein each tooth extends between at least a plurality of the holes of said lower mechanical supporting element.

* * * * *

UNITED STATES PATENT AND TRADEMARK OFFICE
CERTIFICATE OF CORRECTION

| | | |
|---|---|---|
| PATENT NO. | : 8,903,665 B2 | Page 1 of 1 |
| APPLICATION NO. | : 13/233601 | |
| DATED | : December 2, 2014 | |
| INVENTOR(S) | : Rossi et al. | |

It is certified that error appears in the above-identified patent and that said Letters Patent is hereby corrected as shown below:

On the title page, item (54) and in the specification, column 1, line 2, Title, delete "ELECRONIC" and insert --ELECTRONIC--.

Signed and Sealed this
Seventh Day of July, 2015

Michelle K. Lee
*Director of the United States Patent and Trademark Office*